United States Patent
Hartzell et al.

(10) Patent No.: US 9,422,950 B2
(45) Date of Patent: Aug. 23, 2016

(54) FLOATING OPTICAL SENSOR MOUNT

(75) Inventors: John Hartzell, North Little Rock, AR (US); James Cirillo, Cleveland Heights, OH (US); Dustin Hromyak, Warren, OH (US); Hung phi Nguyen, Olmsted Township, OH (US); David B. Crowley, Bryant, AR (US); Michael A. Laurich, Olmsted Falls, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 415 days.

(21) Appl. No.: 14/000,351

(22) PCT Filed: Feb. 21, 2012

(86) PCT No.: PCT/US2012/025879
§ 371 (c)(1),
(2), (4) Date: Aug. 19, 2013

(87) PCT Pub. No.: WO2012/112989
PCT Pub. Date: Aug. 23, 2012

(65) Prior Publication Data
US 2013/0319224 A1     Dec. 5, 2013

Related U.S. Application Data

(60) Provisional application No. 61/444,478, filed on Feb. 18, 2011.

(51) Int. Cl.
*F01B 25/26* (2006.01)
*F15B 15/00* (2006.01)
*F15B 15/28* (2006.01)

(52) U.S. Cl.
CPC ............. *F15B 15/00* (2013.01); *F15B 15/2846* (2013.01); *F15B 15/2892* (2013.01); *Y10T 29/49002* (2015.01)

(58) Field of Classification Search
CPC .................. F16B 15/2892; F16B 15/2876
USPC .................................................. 92/5 R
See application file for complete search history.

(56) References Cited

U.S. PATENT DOCUMENTS 4,839,591 A * 6/1989 Nomura ............ F15B 15/2807
                                                        324/207.13
5,456,020 A    10/1995 Kellner
7,047,865 B2    5/2006 Neumann
(Continued)

FOREIGN PATENT DOCUMENTS

DE    102005029224 A1    2/2006
EP         1508781 A2    2/2005

OTHER PUBLICATIONS

International Search Report and accompanying Written Opinion for 2012/112989 A1.
International Preliminary Report on Patentability for PCT/US2012/025879.

*Primary Examiner* — Nathaniel Wiehe
*Assistant Examiner* — Daniel Collins
(74) *Attorney, Agent, or Firm* — Renner, Otto, Boisselle and Sklar LLP

(57) ABSTRACT

A piston-cylinder actuator includes a unique mount for an absolute-position sensor. The mount is made from a bearing material provides a flexible connection between the sensor mount and the cylinder housing. This flexible connection allows the piston rod to deflect naturally, under its own weight or under other laterally-directed forces, while maintaining the distance and perpendicularity between the sensor and the rod surface, within acceptable limits. The sensor mount is made from a bearing material that will allow it to float directly on the rod surface without scuffing or otherwise damaging the rod surface, particularly the markings or other indicia on that surface. Due to the flexible connection between the sensor mount and the cylinder housing, the proper distance between the sensor and the rod surface can be maintained at all times.

12 Claims, 3 Drawing Sheets

(56) References Cited

U.S. PATENT DOCUMENTS

| | | | |
|---|---|---|---|
| 7,162,947 B2 * | 1/2007 | Kucher | F15B 15/1433 92/168 |
| 2006/0191406 A1 * | 8/2006 | Kucher | F16J 7/00 92/5 R |
| 2008/0197948 A1 * | 8/2008 | Hedayat | G01B 7/003 335/151 |

* cited by examiner

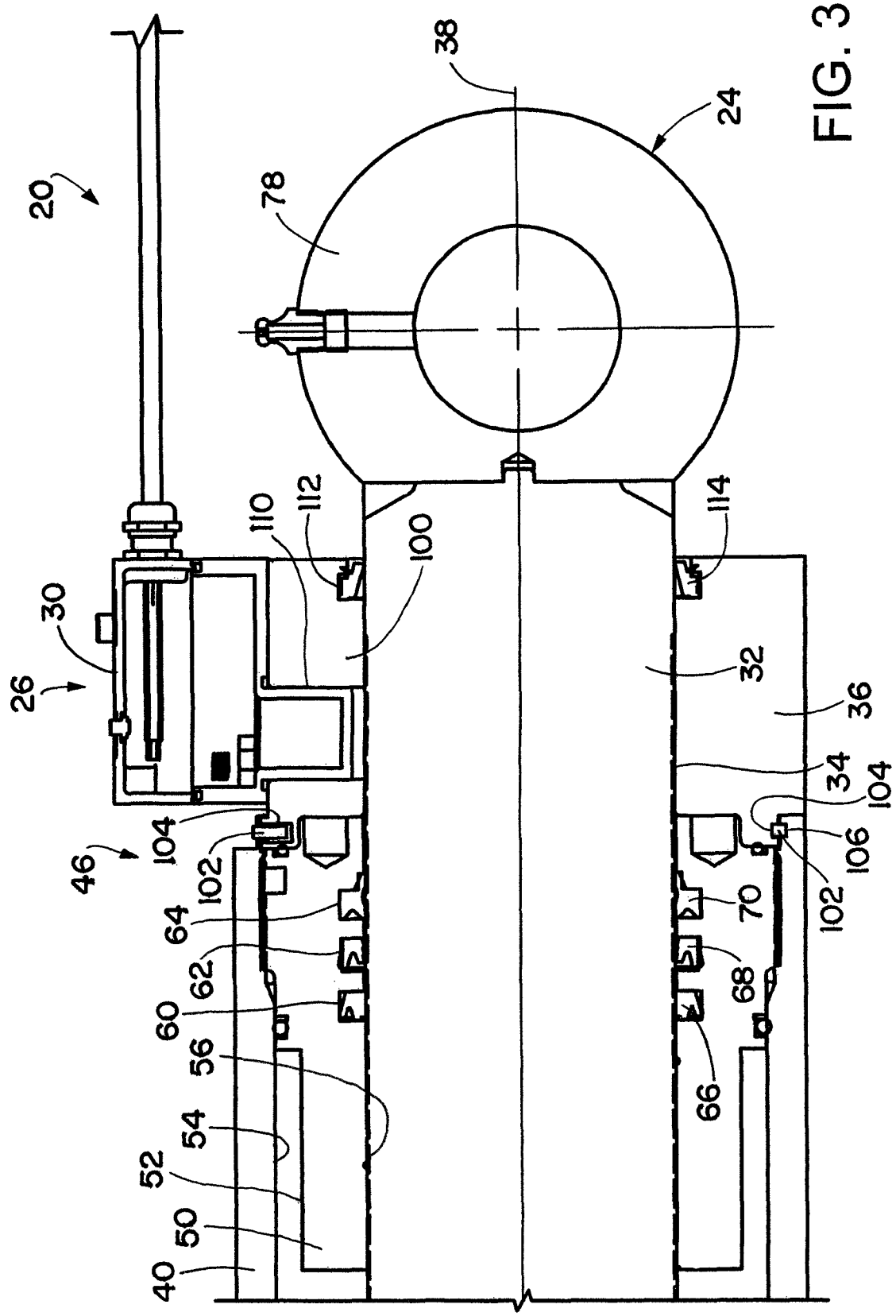

FLOATING OPTICAL SENSOR MOUNT

RELATED APPLICATIONS

This application claims the benefit of U.S. Provisional Application No. 61/444,478 filed Feb. 18, 2011, which is hereby incorporated herein by reference.

FIELD OF THE INVENTION

The present invention relates to a piston-cylinder assembly having a sensor for detecting the position of a piston rod relative to a cylinder housing, and more particularly to a mounting arrangement for the sensor relative to the cylinder housing.

BACKGROUND OF THE INVENTION

Piston-cylinder assemblies are used in various actuator applications throughout industry, such as in construction equipment. Often it is advantageous for an operator to be aware of the specific position of a piston rod in a fluid pressure-operated cylinder since the working member being actuated is generally physically connected to the end of the piston rod.

U.S. Pat. No. 7,047,865, for example, discloses a known actuator with a cylinder housing and a rod that is axially movable relative to the cylinder housing. The actuator also has sensor for absolute position sensing in which light from a light source illuminates a pattern on the rod. The sensor is attached to the cylinder housing and detects light reflected from an adjacent portion of the pattern. The position of the rod relative to the housing is determined from the known position of the sensor relative to the housing and the portion of the pattern detected by the sensor.

In contrast to absolute-position sensors, relative-position sensor systems also are known, but they require periodic "zeroing" to maintain accurate position information. In the event of a power failure, for example, the rod generally must be retracted to a "home" position before being extended again. Depending on the circumstances when the hydraulic cylinder lost power, this might not be practical or even possible. An absolute position sensor always knows the position of the rod, even after a power failure. Knowing absolute position also can be used to more accurately control the actuator extension/retraction.

SUMMARY OF THE INVENTION

While absolute position sensors for piston-cylinder type actuators provide some advantages over relative position sensors, existing methods of mounting the sensors on piston-cylinders generally do not compensate for lateral rod deflection due to the rod's weight or other forces acting transverse to the axial or longitudinal dimension of the rod. This failure to account for lateral deflection results in poor sensor signal data, particularly for long rods, or large diameter rods.

The present invention provides a unique mounting apparatus for an absolute position sensor. Accordingly, the present invention provides a piston-cylinder actuator that includes a unique mount for an absolute-position sensor. The mount, made from a bearing material, provides a flexible connection between the sensor mount and the cylinder housing. This flexible connection allows the piston rod to deflect naturally, under its own weight or under other laterally-directed forces, while maintaining the distance and perpendicularity between the sensor and the marked rod surface, within acceptable limits. The sensor mount is made from a bearing material that will allow it to float directly on the rod surface without scuffing or otherwise damaging the rod surface, particularly the markings or other indicia on that surface. Due to the flexible connection between the sensor mount and the cylinder housing, the proper distance between the sensor and the rod surface can be maintained at all times.

More particularly, the present invention provides a piston-cylinder actuator that includes a cylinder assembly with a cylinder housing. The cylinder housing has a longitudinal axis. The actuator also includes a piston assembly that is generally movable relative to the cylinder assembly along the longitudinal axis. The piston assembly includes a piston rod having indicia extending longitudinally on the rod. The actuator further includes a sensor capable of reading the indicia on the piston rod, and a mount for supporting the sensor relative to the piston rod. The sensor mount is flexibly connected to the cylinder housing to allow the sensor mount to move relative to the cylinder housing to allow the sensor mount to remain in registration with the rod, while maintaining the sensor at a substantially constant position along the longitudinal axis relative to the cylinder housing.

An exemplary embodiment of the actuator provided by the invention further includes one or more of the following features. An exemplary cylinder assembly includes a seal gland mounted in the cylinder housing. The seal gland has a central aperture for receipt of the piston rod. The seal gland is separate from the sensor mount. In an exemplary actuator, clearance between the sensor mount and the piston rod is less than clearance between the seal gland and the piston rod.

An exemplary sensor mount is connected to the cylinder housing with a retaining wire that forms a wire lock. The retaining wire provides a flexible connection between the seal gland and the sensor mount. The flexible connection between the sensor mount and the cylinder housing is provided by ensuring sufficient clearances between the retaining wire, the seal gland, and the sensor mount.

An exemplary sensor mount includes a bearing surface for interfacing with the piston rod and an aperture transverse the bearing surface to provide the sensor with access to the indicia. The mount is made of a bearing material. The mount includes a collar that defines a passage therethrough for receipt of the piston rod. The mount includes a collar that extends around the piston rod. An exemplary sensor is an optical sensor.

The present invention also provides a piston-cylinder actuator including a cylinder assembly with a cylinder housing that defines a cylindrical volume, the cylinder housing having a longitudinal axis. The actuator also includes a piston assembly generally movable relative to the cylinder assembly along the longitudinal axis. The piston assembly includes a piston rod having indicia extending longitudinally on a surface of the rod. The actuator further includes a sensor capable of detecting the indicia on the piston rod, and means for supporting the sensor relative to the piston rod. The support means is flexibly connected to the cylinder housing to pivot relative to the cylinder housing while maintaining the sensor at a substantially constant position along the longitudinal axis relative to the cylinder housing. The support means includes a sensor mount made of a bearing material.

Finally, the present invention provides a method of providing a flexible connection for a sensor mounted on a piston-cylinder actuator. The method includes the steps of: a) separating an optical sensor mount assembly from a seal gland assembly; b) providing less clearance between the sensor mount and a rod than the clearance between a seal gland and the rod; c) providing a wire lock connection between the seal gland and sensor mount; and d) building in sufficient clearances between the wire lock, seal gland, and sensor mount to allow flex between the seal gland and sensor mount.

Further features of the invention will become apparent from the following detailed description when considered in conjunction with the drawings.

BRIEF DESCRIPTION OF THE DRAWINGS

FIG. 3 is an enlarged view of an aperture-end portion of the actuator shown in FIG. 2.

DETAILED DESCRIPTION

Figure 1:
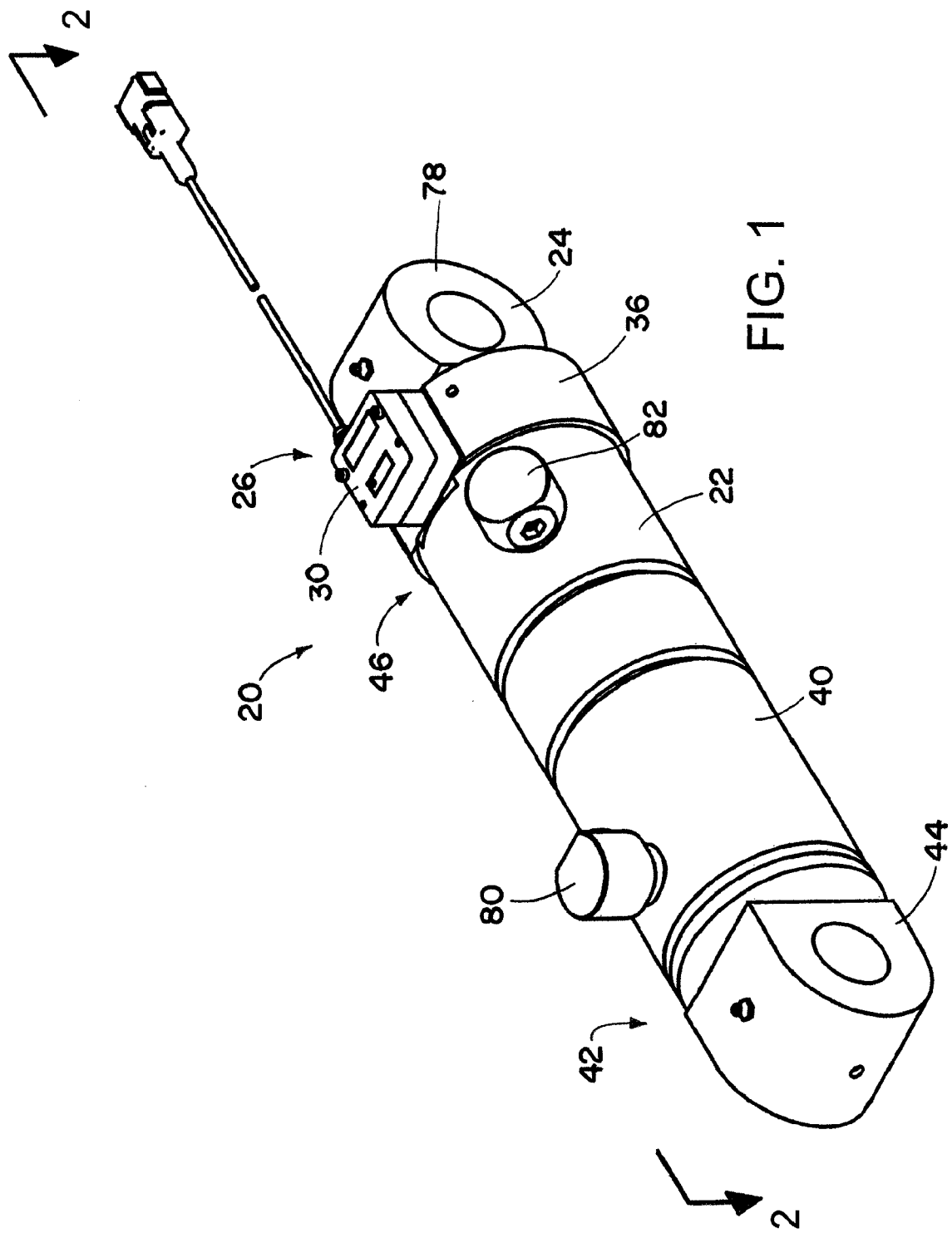
FIG. 1 is a perspective view of an exemplary piston-cylinder actuator provided in accordance with the invention.
Figure 2:
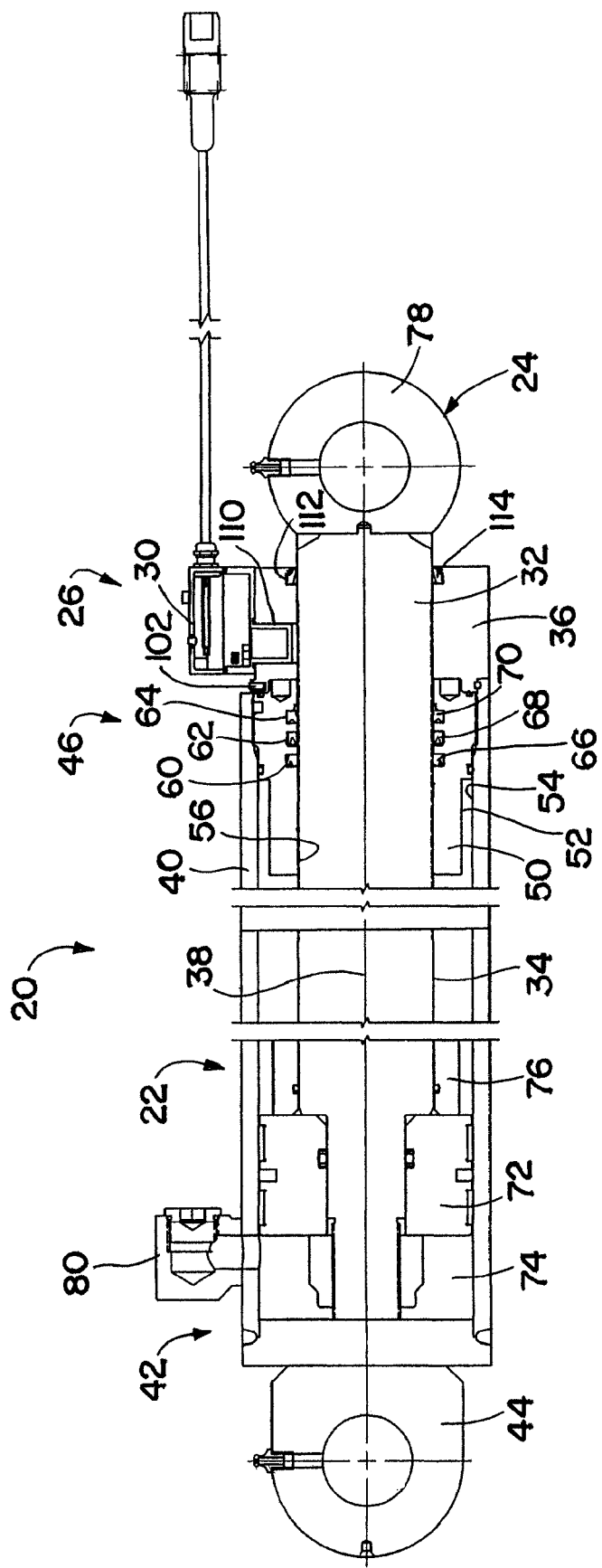
FIG. 2 is a longitudinal cross-sectional view of the actuator of FIG. 1 as seen along lines 2-2.

Referring now to the drawings and initially to FIGS. 1 and 2, an exemplary embodiment of an actuator provided by the invention is shown generally at 20. The actuator 20 includes a cylinder assembly 22, a piston assembly 24 that is movable relative to the cylinder assembly 22, and a sensor assembly 26 with a sensor 30 for detecting the absolute position of the piston assembly 24 relative to the cylinder assembly 22. The piston assembly 24 includes an elongated piston rod 32 that has indicia markings (not shown) provided on at least a longitudinal portion of its peripheral surface 34. These markings include patterns that vary along the length of the rod 32, enabling the sensor 30 to identify the position of the rod 32 from a portion of the pattern adjacent the sensor 30. Thus the indicia can be formed in the surface 34 of the rod 32, embedded in the rod 32, etched, carved, formed, or printed on the rod 32, or otherwise provided by other devices that function to identify the position of the indicia relative to the rod 32. The sensor 30 is supported by supporting means in the form of a sensor mount 36 that is made of a bearing material that floats on the piston rod 32 as the rod 32 moves, allowing the sensor mount 32 to remain in registration with the rod 32 without damaging the markings on the rod 32. The sensor mount 36 is flexibly coupled to the cylinder assembly 22 to accommodate transaxial displacement of the rod 32 relative to a longitudinal axis 38 of the cylinder assembly 22 while maintaining a substantially constant position along the axis 38. The flexible connection enables the sensor mount 36 to maintain a proper relationship between the sensor 30 and the surface 34 of the piston rod 32, even when the piston rod 32 is deflected from alignment with the longitudinal axis 38 of the cylinder assembly 22 due to the weight of the rod 32 or other laterally-acting forces on the rod 32, sometimes referred to as side load conditions.

Although the illustrated piston-cylinder actuator 20 is designed for axial movement of the piston assembly 24, the sensor mount 36 provided by the present invention is applicable to other types of actuators, such as actuators with piston assemblies that rotate relative to the cylinder assembly.

Turning to further details of the various components, the cylinder assembly 22 includes a cylindrical housing 40, and the piston assembly 24 is movable relative to the cylinder housing 40 back and forth along the longitudinal axis 38. The illustrated cylinder housing 40 has two opposed ends, one end 42 being closed by a cylinder coupling 44, while the other end 46 is adapted to receive a seal gland 50.

The seal gland 50 has an outside surface 52 that mates and sealingly interacts with a corresponding inside surface 54 of the cylinder housing 40. The seal gland 50 also has an inner annular surface 56 that defines a central axial aperture that receives the piston rod 32. The aperture in the seal gland 50 allows reciprocating passage or movement of the piston rod 32. The inner peripheral surface 56 of the seal gland 50 has a series of spaced circumferential recesses, 60-64, which receive peripheral seals 66-70, respectively. The peripheral seals 66-70 provide a leak-tight seal between the peripheral surface 34 of the piston rod 32 and the inner peripheral surface 56 of the seal gland 50. The diameter of the seal gland aperture and the diameter of the piston rod 32 are dimensioned to permit the smooth passage of the piston rod 32 while preventing pressurized working fluid from migrating outside the pressurized volume of the cylinder housing 40. The seal gland 50 generally is flush with the apertured end 46 of the cylinder housing 40.

The piston assembly 24 includes the piston rod 32, which extends through the aperture in the seal gland 50, and a piston head 72 that is closely received within the cylinder housing 40. The piston head 72 sealingly divides the cylinder housing 40 into two chambers 74 and 76. The piston assembly 24 also can be referred to as a plunger assembly. The piston rod 32 is attached to the piston head 72 at one end, and an opposing end of the piston rod includes a rod coupling 78 for connecting the actuator 20 to an object to be moved.

The piston assembly 24 generally is movable along an axis of the piston rod 32, which in FIG. 2 is coextensive with the longitudinal axis 38 of the cylinder housing 40. The piston assembly 24 and the cylinder housing 40 can reciprocate relative to each other depending upon which cylinder chamber 74 or 76 is pressurized. Pressure is supplied to the cylinder housing 40 by any desired external pressure source (not shown) to a first cylinder port 80 coupled to the chamber 74, and exhausted via a second cylinder port 82 coupled to the cylinder chamber 76, and vice versa, depending on the desired direction of movement. The piston rod 32 cooperates with the central longitudinal aperture in the seal gland 50 to close the apertured end 46 of cylinder housing 40.

The piston rod 32 and the associated indicia on the rod 32 move relative to both the cylinder housing 40 and the sensor 30, which reads the indicia adjacent the sensor 30 to determine the position of the rod 32 relative to the cylinder housing 40. The sensor 30 preferably is an absolute-position sensor. An exemplary absolute-position sensor is an optical sensor, such as the Intellinder™ sensor from Parker Hannifan Corp. of Cleveland, Ohio U.S., although other non-optical type sensors also may benefit from the sensor mount 36 provided by the invention. The optical sensor 30 typically includes a light source (such as a light-emitting diode, generally referred to as an LED) and a light sensor (generally a charge coupled device or CCD) that are mounted on a circuit board (sometimes referred to as a printed circuit board or PCB). Light guiding elements guide the light from the light source to the surface 34 of the rod 32, and reflected light from the rod 32 to the light sensor.

Maintaining a specific distance between the sensor 30 and the surface of the rod 32 is important to ensure effective sensing accuracy. If the distance is too great or too small, or if the sensor 30 does not face squarely (perpendicularly) on the surface of the rod 32, the position-determining portion of the pattern visible to the sensor 30 will be out of focus. Testing has shown that a transverse or side load induced by the weight of the rod 32 itself or other laterally-acting forces on the rod 32, deflects the rod 32 from the axis 38 of the cylinder housing 40, forming an angle between the axis of the rod 32 and the axis of the cylinder 40. The greater the distance between the sensor 30 and the cylinder housing 40, the more exaggerated the problem becomes. This problem is more evident in actuators with larger diameter and longer piston rods.

The means for supporting the sensor 30, such as the illustrated sensor mount 36, includes a bearing platform 100 that is tethered to the cylinder housing 40 with a flexible coupling that accommodates deflection of the rod 32 from alignment of its longitudinal axis with the longitudinal axis 38 of the cylinder housing 40. The bearing platform 100 is made of a bearing material. The sensor 30 is mounted directly to the bearing material, rather than being mounted on a support structure that is in turn coupled to a separate bearing material. The flexible coupling allows the sensor mount 36 to pivot or rotate about an axis transverse the longitudinal axis 38 of the cylinder housing 40 to accommodate the transaxial displacement or bending of the rod 32, while remaining in contact with the rod 32 and in a substantially constant position along that axis 38.

The flexible coupling is provided by a flexible retaining wire 102 and corresponding grooves 104 and 106 in the mount 36 and the inner surface of the cylinder housing 40, respectively, that form a wire lock. The sensor mount 36 is thus separate from the seal gland 50. The retaining wire 102 prevents movement between the mount 36 and the cylinder housing 40 along the axis 38, but sufficient clearance between the wire lock, seal gland 50 and sensor mount 36 exists to allow the sensor mount 36 to flex relative to the cylinder housing 40. In other words, the wire lock permits some rotation of the sensor mount 36 about an axis transverse the longitudinal axis 38. The wire lock thus allows the sensor mount 36 to pivot relative to the cylinder housing 40, thereby maintaining a consistent orientation and spacing between the sensor 30 and the surface 34 of the rod 32. In minimizing or preventing movement along the longitudinal axis 38 of the cylinder housing 40, the wire lock also maintains a substantially constant axial position of the sensor 30 relative to the cylinder housing 40. Other types of flexible coupling also would work, such as a gimbal mount or other arrangement.

The illustrated sensor mount 36 is in the shape of a collar that extends completely around the piston rod 32. The central aperture in the sensor mount 36 receives and is substantially filled by the piston rod 32. The axis of the central aperture in the mount 36 preferably is coextensive with the longitudinal axis of the piston rod 32 at all times. The sensor mount 36 further includes a transverse passage or bore 110 that intersects the central aperture, preferably perpendicular to the axis of the aperture, which axis is aligned with the longitudinal axis of the rod 32 when assembled. The mount 36 preferably includes one or more wiper seals adjacent the sensor bore 110 to clear debris from the rod surface 34. In the illustrated embodiment, an inner peripheral surface of the mount 36 has a circumferential recess 112 that receives a peripheral seal or wiper 114 that prevents debris on the surface 34 of the rod 32 that might interfere with the sensor's detection of the pattern on the piston rod 32 from entering the aperture. The opposing side of the sensor bore 110 is protected by the seals 66-70 in the seal gland 50. The sensor bore 110 is thus interposed between the outer wiper 114 and the peripheral seals 66-70 of the seal gland 50.

Accordingly, a method of providing a flexible connection for an absolute-position sensor 30 in a piston-cylinder actuator 20 comprises the following steps: a) separating the optical sensor mount 36 from the seal gland 50; b) providing less clearance between the sensor mount 36 and the piston rod 32 than the clearance between the seal gland 50 and the rod 32; c) providing a wire lock connection between the seal gland 50 and the sensor mount 36; and d) building in sufficient clearances between the wire lock, seal gland 50, and sensor mount 36 to allow flex between the seal gland 50 and sensor mount 36.

While the sensor mount 36 has been shown and described as part of a complete system, the actuator 20, the sensor mount 36 also could be provided as part of a kit for retrofitting existing actuators. Additionally, although the invention is described with reference to a piston-cylinder actuator, the sensor can be used with hydraulic actuators, pneumatic actuators, rotary actuators, or any other device that requires position sensing. Moreover, the invention is not limited to optical sensors, and the principles of the invention may be applicable to other types of sensors that need to be precisely positioned relative to the moving object being detected, such as a magnetic-type sensor that needs to have a read head closely spaced relative to surface with magnetically-readable indicia.

In summary, the present invention provides an actuator design with a unique sensor mount 36 made from a bearing material and a flexible connection between the sensor mount 36 and the cylinder housing 40. This flexible connection allows the rod 32 to deflect naturally, under its own weight or under other laterally-directed forces, while maintaining the distance and perpendicularity between the sensor 30 and the marked rod surface, within acceptable limits. This flexible connection is attained by a) separating the sensor mount 36 from the seal gland 50; b) providing less clearance between the sensor mount 36 and the rod 32 than between the seal gland 50 and the rod 21; c) providing a wire lock connection between the seal gland 50 and the sensor mount 36; and d) building in sufficient clearances between the retaining wire 102, the seal gland 50, and the sensor mount 36 to allow 'flex' or limited relative non-axial movement between the seal gland 50 and the sensor mount 36. The sensor mount 36 is made from a bearing material that will allow it to float directly on the rod surface 34 without scuffing or otherwise damaging the rod surface 34, particularly the markings or other indicia on that surface. Due to the flexible connection between the sensor mount 36 and the cylinder housing 40, the proper distance between the sensor 30 and the rod surface 34 can be maintained at all times. The concepts in (a)-(d) above, in conjunction with the sensor mount 36, provide a unique solution to the lateral deflection problem.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A piston-cylinder actuator, comprising:
   a cylinder assembly including a cylinder housing, the cylinder housing having a longitudinal axis;
   a piston assembly generally movable relative to the cylinder assembly along the longitudinal axis, the piston assembly including a piston rod having indicia extending longitudinally on the rod;

a sensor capable of reading the indicia on the piston rod; and a mount for supporting the sensor relative to the piston rod;

where the sensor mount is flexibly connected to the cylinder housing to allow the sensor mount to move relative to the cylinder housing to allow the sensor mount to remain in registration with the rod, while maintaining the sensor at a substantially constant position along the longitudinal axis relative to the cylinder housing;

where the cylinder assembly includes a seal gland mounted in the cylinder housing, the seal gland having a central aperture for receipt of the piston rod;

where the sensor mount is connected to the cylinder housing with a retaining wire that forms a wire lock.

2. An actuator as set forth in claim 1, where the seal gland is separate from the sensor mount.

3. An actuator as set forth in claim 1, where the flexible connection between the sensor mount and the cylinder housing is provided by ensuring sufficient clearances between the retaining wire, the seal gland, and the sensor mount.

4. An actuator as set forth in claim 1, where the mount includes a bearing surface for interfacing with the piston rod and an aperture transverse the bearing surface to provide the sensor with access to the indicia.

5. An actuator as set forth in claim 1, where the mount is made of bearing material.

6. An actuator as set forth in claim 1, where the mount includes a collar that defines a passage therethrough for receipt of the piston rod.

7. An actuator as set forth in claim 1, where the mount includes a collar that extends around the piston rod.

8. An actuator as set forth in claim 1, where the sensor is an optical sensor.

9. A piston-cylinder actuator, comprising:

a cylinder assembly including a cylinder housing, the cylinder housing having a longitudinal axis;

a piston assembly generally movable relative to the cylinder assembly along the longitudinal axis, the piston assembly including a piston rod having indicia extending longitudinally on the rod;

a sensor capable of reading the indicia on the piston rod; and a mount for supporting the sensor relative to the piston rod;

where the sensor mount is flexibly connected to the cylinder housing to allow the sensor mount to move relative to the cylinder housing to allow the sensor mount to remain in registration with the rod, while maintaining the sensor at a substantially constant position along the longitudinal axis relative to the cylinder housing;

where the cylinder assembly includes a seal gland mounted in the cylinder housing, the seal gland having a central aperture for receipt of the piston rod, and where a wire lock provides a flexible connection between the seal gland and the sensor mount.

10. A piston-cylinder actuator, comprising:

a cylinder assembly including a cylinder housing that defines a cylindrical volume, the cylinder housing having a longitudinal axis;

a piston assembly generally movable relative to the cylinder assembly along the longitudinal axis, the piston assembly including a piston rod having indicia extending longitudinally on a surface of the rod;

a sensor capable of reading the indicia on the piston rod; and means for supporting the sensor relative to the piston rod;

where the support means is flexibly connected to the cylinder housing to pivot relative to the cylinder housing while maintaining the sensor at a substantially constant position along the longitudinal axis relative to the cylinder housing;

where the cylinder assembly includes a seal gland mounted in the cylinder housing, the seal gland having a central aperture for receipt of the piston rod, and where the sensor mount is connected to the cylinder housing with a retaining wire that forms a wire lock.

11. An actuator as set forth in claim 10, where the support means includes a sensor mount made of a bearing material.

12. A method of providing a flexible connection for a sensor mounted on a piston-cylinder assembly comprising the steps of:

a) separating an optical sensor mount assembly from a seal gland assembly;

b) providing a wire lock connection between the seal gland and sensor mount c) building in sufficient clearances between the wire lock, seal gland, and sensor mount to allow 'flex' between the seal gland and sensor mount.

\* \* \* \* \*